US011887302B2

(12) United States Patent
Yuan et al.

(10) Patent No.: US 11,887,302 B2
(45) Date of Patent: Jan. 30, 2024

(54) SYSTEMS AND METHODS FOR DETECTING CYTOPATHIC EFFECT IN CELLS

(71) Applicant: AMGEN INC., Thousand Oaks, CA (US)

(72) Inventors: Yu Yuan, Chicago, IL (US); Tony Y. Wang, League City, TX (US); Jordan P. Simons, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 415 days.

(21) Appl. No.: 17/298,095

(22) PCT Filed: Nov. 26, 2019

(86) PCT No.: PCT/US2019/063175
§ 371 (c)(1),
(2) Date: May 28, 2021

(87) PCT Pub. No.: WO2020/112722
PCT Pub. Date: Jun. 4, 2020

(65) Prior Publication Data
US 2022/0028065 A1   Jan. 27, 2022

Related U.S. Application Data

(60) Provisional application No. 62/774,160, filed on Nov. 30, 2018.

(51) Int. Cl.
G06K 9/00         (2022.01)
G06T 7/00         (2017.01)
(Continued)

(52) U.S. Cl.
CPC .............. *G06T 7/0012* (2013.01); *G06T 7/11* (2017.01); *G06T 7/136* (2017.01);
(Continued)

(58) Field of Classification Search
None
See application file for complete search history.

(56) References Cited

U.S. PATENT DOCUMENTS

| | | | |
|---|---|---|---|
| 6,246,785 B1* | 6/2001 | Molnar | G01N 15/1475 382/133 |
| 2009/0088370 A1* | 4/2009 | Winge | C07K 14/755 435/69.51 |

(Continued)

FOREIGN PATENT DOCUMENTS

WO   WO-2017/218202 A1   12/2017

OTHER PUBLICATIONS

Hou et al., "Patch-Based Convolutional Neural Network for Whole Slide Tissue Image Classification", 2016 IEEE Conference on Computer Vision and Pattern Recognition, Jun. 1, 2016, pp. 2424-2433.

(Continued)

Primary Examiner — Feng Niu
(74) Attorney, Agent, or Firm — MARSHALL, GERSTEIN & BORUN LLP

(57) ABSTRACT

A method for detecting cytopathic effect (CPE) in a well sample includes generating a well image depicting a well containing cells and a medium (and possibly viruses), and pre-processing the well image at least by partitioning the well image into sub-images each corresponding to a different portion of the well. The method also includes, for each of some or all of the sub-images, determining, by analyzing the sub-image using a convolutional neural network, a respective score indicative of a likelihood that any cells in the portion of the well corresponding to the sub-image exhibit CPE. The method further includes determining a CPE status of the cells contained in the well based on the (Continued)

respective scores for the sub-images, and generating output data indicating the CPE status.

21 Claims, 5 Drawing Sheets

(51) Int. Cl.
  *G06T 7/136* (2017.01)
  *G06T 7/11* (2017.01)
(52) U.S. Cl.
  CPC ............... *G06T 2207/10056* (2013.01); *G06T 2207/20021* (2013.01); *G06T 2207/20076* (2013.01); *G06T 2207/20081* (2013.01); *G06T 2207/20084* (2013.01); *G06T 2207/30024* (2013.01); *G06T 2207/30072* (2013.01)

(56) References Cited

U.S. PATENT DOCUMENTS

| | | | |
|---|---|---|---|
| 2021/0081698 A1* | 3/2021 | Lindeman | G06Q 50/30 |
| 2021/0317399 A1* | 10/2021 | Nazareth | C12M 41/48 |
| 2021/0340498 A1* | 11/2021 | Lee | C12N 5/0668 |

OTHER PUBLICATIONS

Kovalev et al., "Deep Learning in Big Image Data: Histology Image Classification for Breast Cancer Diagnosis", Big Data and Advanced Analytics, Proc. 2nd International Conference, Jun. 15-17, 2016, 8 pages.

Search Report and Written Opinion in International Application No. PCT/US2019/063175 dated Jan. 31, 2020, 15 pages.

* cited by examiner

300 → L929 and 324K(both non-CPE)

302 → Two CPE samples from L929 cell line

304 → L929 CPE sample with one "CPE spot"

SYSTEMS AND METHODS FOR DETECTING CYTOPATHIC EFFECT IN CELLS

FIELD OF DISCLOSURE

The present application relates generally to viral detection techniques, and more specifically to techniques for detecting cytopathic effect (CPE) in cells.

BACKGROUND

When a virus infects a host cell, the host cell may undergo structural/morphological changes referred to as "cytopathic effect," or CPE. In some applications (e.g., when performing quality control procedures in connection with certain commercial drugs, or for research and development purposes), it is necessary to inspect cell culture samples for the presence of CPE. For example, virus stock potency is typically measured using titration assays, which are classical, cell culture-based methods that rely on visual observations of virus-induced cytopathology. One commonly used technique for quantifying the amount of an infectious virus is the "tissue culture infection dose 50%," or $TCID_{50}$, assay. $TCID_{50}$ assays are endpoint dilution assays that quantify the amount of virus required to produce CPE in 50% of inoculated tissue culture cells. $TCID_{50}$ assays may be used for viral clearance studies (e.g., when determining the ability of a particular purification process to remove or inactivate a virus), for example.

Conventionally, CPE is manually detected by human analysts inspecting images of wells. For a $TCID_{50}$ assay, for example, a human analyst may need to inspect a number of well images that each correspond to a different dilution level. Manual visual inspection is a time consuming process, as the analyst must carefully inspect each image for any evidence of CPE. Moreover, the task is complicated—and the accuracy of CPE or non-CPE classifications can suffer—due to the fact that different cell lines (e.g., the L929, PG4, Vero and 324K cell lines) can have different morphologies when exhibiting CPE, as well as the fact that different viruses can induce different cytopathic effects in host cells of a single cell line. Different cytopathic effects may include elongation, inclusion bodies, foci formation, syncytia formation, and/or cell lysis, for example.

SUMMARY

Embodiments described herein relate to systems and methods that improve upon conventional visual inspection techniques used for CPE detection. In particular, a visual inspection system captures at least one digital image of each well within a well plate, with each well containing a number of cells in a medium (and possibly viruses, e.g., according to a controlled dilution). As used herein "well" refers to any laboratory-scale cell culture environment that permits optical inspection of its contents. While wells on multi-well plates are discussed by way of example herein, it will be appreciated that wherever a "well" and a "well plate" are mentioned, unless stated otherwise, these terms are contemplated to encompass any suitable laboratory-scale cell culture environment permitting optical inspection of its contents. Each well image is pre-processed by partitioning the image into a number of segments, or "sub-images," that each correspond to (i.e., depict) a different portion of the well. The well image may also be pre-processed in other ways, such as removing portions of the image that depict areas outside of the well.

For a given well image, each sub-image is analyzed using a convolutional neural network (CNN), in order to determine a score for that sub-image. The CNN may be specific to the cell line in the well that is being inspected (e.g., the L929, PG4, Vero or 324K cell line). The score for each sub-image is indicative of the likelihood that any cells in the portion of the well corresponding to the sub-image exhibit CPE. For example, each score may be a probability that is greater than 0.00000 and less than 1.00000. Collectively, the scores for the various sub-images may be used to determine (e.g., predict) a CPE status of the cells depicted in the entire well image. For example, the sub-image scores may be used to determine, in binary fashion, whether the contents of the well image, as a whole, exhibit CPE. In one such embodiment, the sub-image scores are input to a support vector machine (SVM) that classifies the contents depicted in the well image as "CPE" or "not CPE" (or another, similar binary classification). In other embodiments, the CPE status is not binary. For example, the sub-image scores may be used to determine a probability that the contents of the well image, as a whole, exhibit CPE, such as a probability at or below a specified threshold, for example no more than a 50%, 40%, 30%, 20%, 10%, 5%, 3%, 2%, 1%, or 0.1% probability that the contents of the well image, as a whole, exhibit CPE. Optionally, a well may be determined to be "not CPR" or to have a probability that the content of the well image, as a whole, exhibits CPE below the specified threshold can be selected for further cell culture. For example, a cell of the well (as a single cell, or comprised by a portion of the contents of the well) can be transferred to a new culture environment, and cultured in the new culture environment. Information on cell culture can be found, for example, in Green and Sambrook, "Molecular Cloning: A Laboratory Manual" (4th edition) Cold Spring Harbor Laboratory Press 2012, which is incorporated by reference herein in its entirety.

The CPE status may be determined at each of a number of serial dilution stages (e.g., for a $TCID_{50}$ assay), in some embodiments. Depending on the application, the CPE status (e.g., classification), or CPE statuses at different stages of serial dilution, may be used in different ways. For example, a graphical user interface (GUI) may present the CPE status or statuses to a human user. As another example, the CPE status(es) may be provided to another software application or computer system, e.g., for the purpose of gathering statistics across many wells and/or well plates. The CPE status(es), and/or statistics that take the CPE statuses of a number of wells or well plates into account, may be used to determine the capacity of a purification process to remove or inactivate a virus, for example (e.g., for a quality control procedure during drug manufacture, or for research and development purposes, etc.), or for any other suitable purpose.

BRIEF DESCRIPTION OF THE DRAWINGS

The skilled artisan will understand that the figures, described herein, are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
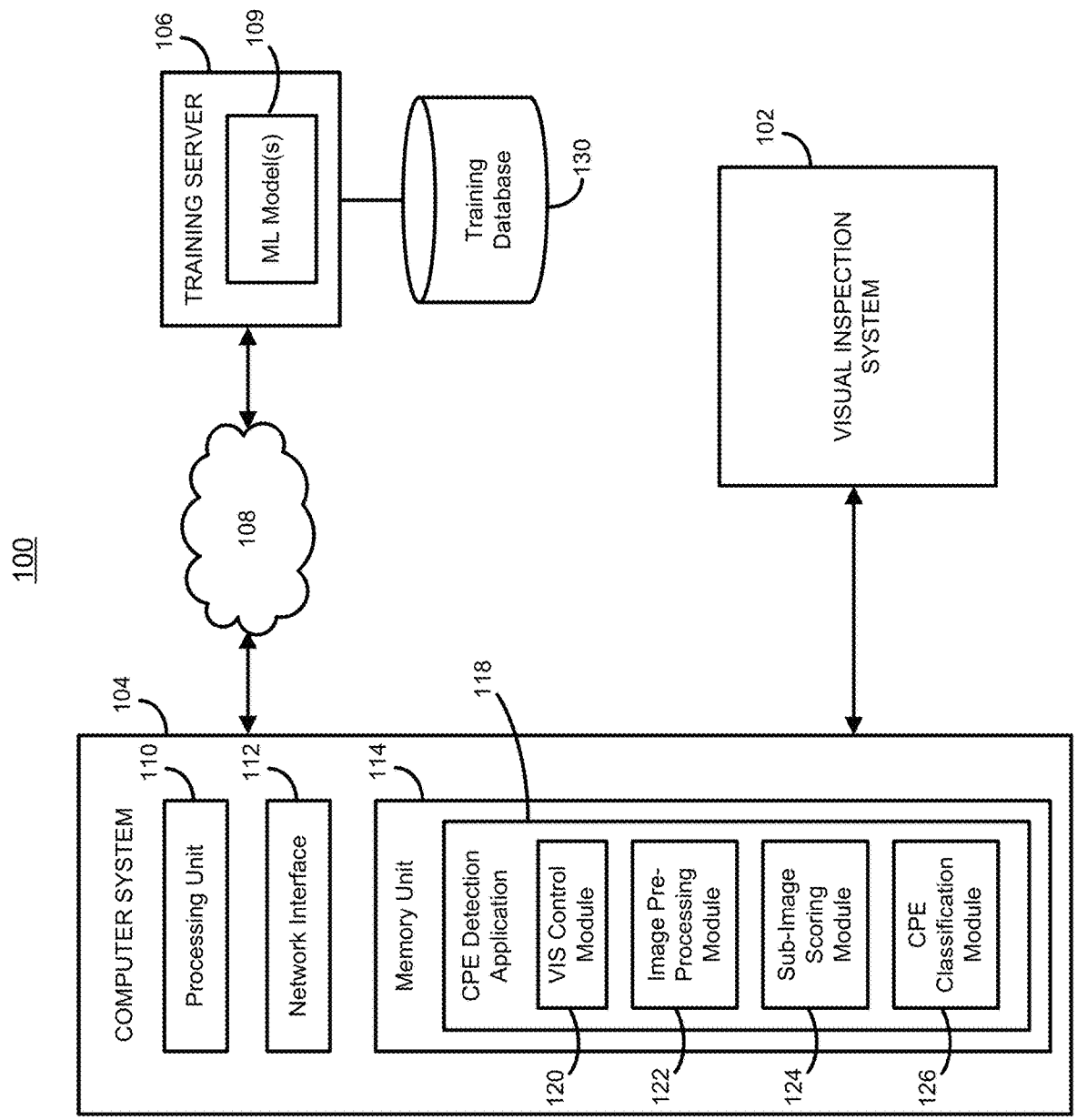
FIG. 1 is a simplified block diagram of an example system that may implement the techniques described herein.

FIG. 1 is a simplified block diagram of an example system 100 that may implement the techniques described herein. System 100 includes a visual inspection system 102 communicatively coupled to a computer system 104. Visual inspection system 102 includes hardware (e.g., a well plate stage, one or more lenses and/or mirrors, an imager, etc.), as well as firmware and/or software, that is configured to capture digital images of wells within a well plate. While FIG. 1 depicts, and is primarily described herein with reference to, an embodiment in which visual inspection system 102 is controlled by computer system 104, it is understood that, in other embodiments, visual inspection system 102 may purely (or primarily) implement local control (e.g., if visual inspection system 102 includes an off-the-shelf product such as the CloneSelect imager from Molecular Devices, LLC).

Figure 2:
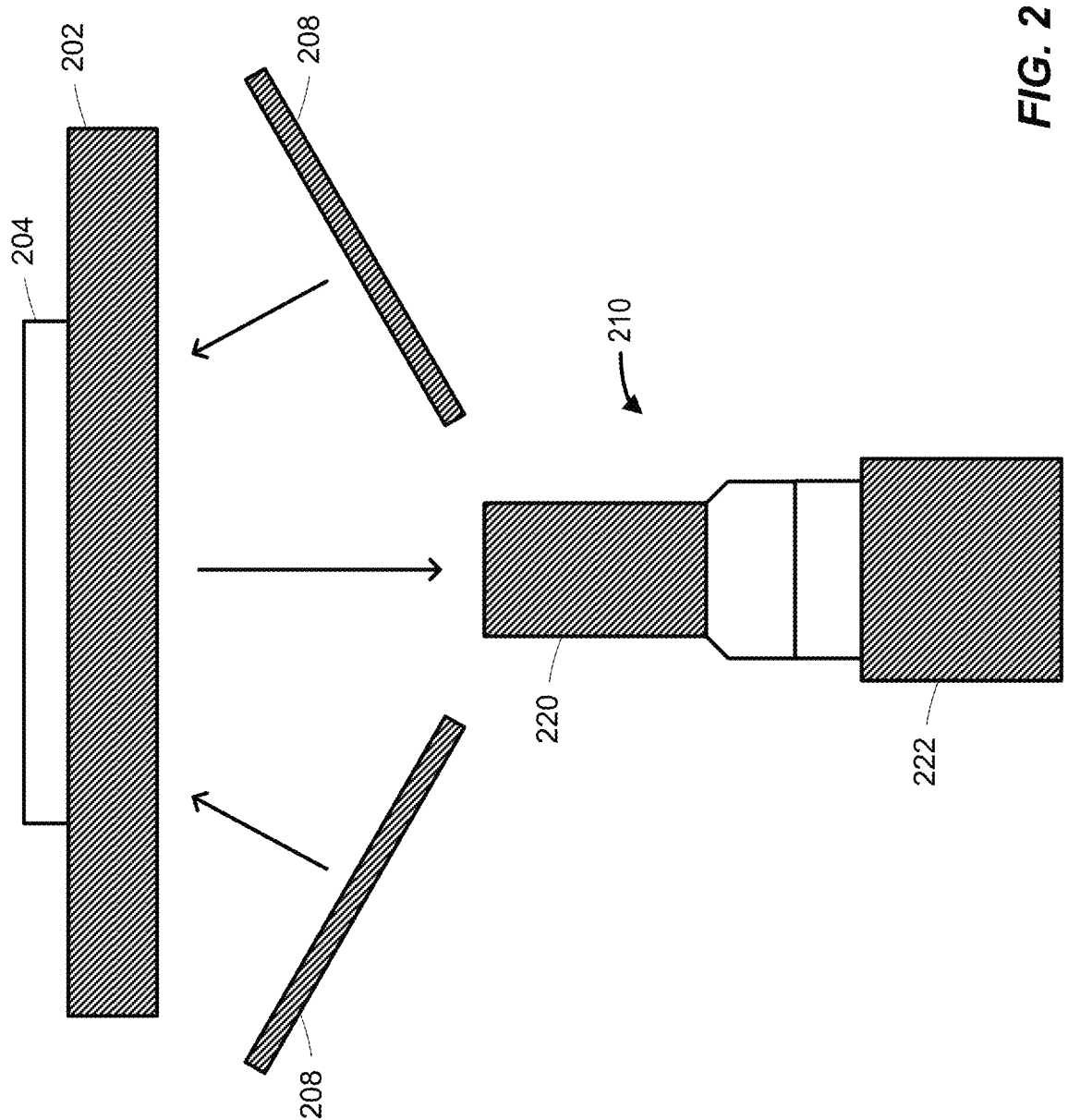
FIG. 2 depicts an example visual inspection system that may be used in the system as described herein, such as the system of FIG. 1.

An example embodiment of visual inspection system 102 is shown in FIG. 2. As seen in FIG. 2, visual inspection system 102 may include a stage 202 that is configured to receive a well plate 204 containing a number of wells (not shown in FIG. 2). Well plate 204 may be any suitable size and/or shape, and have any suitable number of wells disposed thereon (e.g., 6, 24, 96, 384, 1536, etc.). Moreover, the wells may be arranged in any suitable pattern on well plate 204, such as a 2:3 rectangular matrix, for example.

Visual inspection system 102 further includes an illumination system 208, and an imager 210 that is configured to acquire images. Illumination system 208 may include any suitable number and/or type(s) of light source(s) configured to generate source light, and illuminates each well of well plate 204 when that well is positioned in the optical path of imager 210. In various embodiments, each well may have one or more transparent and/or opaque portions. For example, each of the wells may be entirely transparent, or may have transparent bottoms with the side walls being opaque. Each of the wells may generally be cylindrical, or have any other suitable shape (e.g., a cube, etc.).

Visual inspection system 102 may image each of the wells in well plate 204 sequentially. To this end, visual inspection system 102 may be configured to move imager 210, and/or one or more optical elements (e.g., mirrors) that adjust the optical path of imager 210, so as to successively align each of the wells with the optical path of imager 210 for individual well analysis. Alternatively, visual inspection system 102 may move stage 202 along one or more (e.g., x and/or y) axes to successively align the different wells. Imager 210, stage 202, and/or other components of visual inspection system 102 may be coupled to one or more motorized actuators, for example. Regardless of which mechanism is used to align different wells with the optical path of imager 210, as each well is aligned imager 210 acquires one or more images of the illuminated well.

It is understood that FIG. 2 shows only one example embodiment of visual inspection system 102, and that others are possible. For example, visual inspection system 102 may include multiple imagers similar to imager 210 (e.g., for three-dimensional imaging), illumination system 208 may instead be configured to provide backlighting for well plate 204, and so on. Moreover, while not shown in FIG. 2, visual inspection system 102 may include one or more communication interfaces and processors to enable communication with computer system 104, and/or one or more processors to provide local control of certain operations (e.g., capturing images by imager 210, if not controlled by computer system 104).

Referring again now to FIG. 1, computer system 104 may, in this embodiment, generally be configured to control/automate the operation of visual inspection system 102, and to receive and process images captured/generated by visual inspection system 102, as discussed further below. Computer system 104 is also coupled to a training server 106 via a network 108. Network 108 may be a single communication network, or may include multiple communication networks of one or more types (e.g., one or more wired and/or wireless local area networks (LANs), and/or one or more wired and/or wireless wide area networks (WANs) such as the Internet). As discussed further herein, training server 106 is generally configured to train one or more machine learning (ML) models 109, which training server 106 sends to computer system 104 via network 108. In various embodiments, training server 106 may provide ML model(s) 109 as a "cloud" service (e.g., Amazon Web Services), or training server 106 may be a local server. Alternatively or additionally, ML model(s) 109 is/are transferred to computer system 104 by a technique other than a remote download (e.g., by physically transferring a portable storage device to computer system 104), in which case system 100 may not include network 108. In some embodiments, one, some or all of ML model(s) 109 may be trained on computer system 104, and then uploaded to server 106. In other embodiments, computer system 104 performs the model training locally without uploading the ML model(s) 109 to training server 106, in which case system 100 may omit both network 108 and training server 106. As yet another example, system 100 may include a cloud computing environment in which training server 106 (or another server that is not shown in FIG. 1 but is communicatively coupled to computer system 104 via network 108) performs the scoring, classification, and/or other operations discussed below in connection with computer system 104. In some embodiments, some or all of the components of computer system 104 shown in FIG. 1 (e.g., one, some or all of modules 120 through 126) are instead included in visual inspection system 102, in which case visual inspection system 102 may communicate directly with training server 106 via network 108.

Computer system 104 may be a general-purpose computer that is specifically programmed to perform the operations discussed herein, or may be a special-purpose computing device. As seen in FIG. 1, computer system 104 includes a processing unit 110, a network interface 112 and a memory unit 114. In some embodiments, however, computer system 104 includes two or more computers that are either co-located or remote from each other. In these distributed embodiments, the operations described herein relating to processing unit 110, network interface 112 and/or memory unit 114 may be divided among multiple processing units, network interfaces and/or memory units, respectively.

Processing unit 110 includes one or more processors, each of which may be a programmable microprocessor that executes software instructions stored in memory 114 to execute some or all of the functions of computer system 104 as described herein. Processing unit 110 may include one or more graphics processing units (GPUs) and/or one or more central processing units (CPUs), for example. Alternatively, or in addition, some of the processors in processing unit 110 may be other types of processors (e.g., application-specific integrated circuits (ASICs), field-programmable gate arrays (FPGAs), etc.), and some of the functionality of computer system 104 as described herein may instead be implemented in hardware. Network interface 112 may include any suitable hardware (e.g., a front-end transmitter and receiver hardware), firmware, and/or software configured to communicate with training server 106 via network 108 using one or more communication protocols. For example, network interface 112 may be or include an Ethernet interface, enabling computer system 104 to communicate with training server 106 over the Internet or an intranet, etc. Memory unit 114 may include one or more volatile and/or non-volatile memories. Any suitable memory type or types may be included, such as read-only memory (ROM), random access memory (RAM), flash memory, a solid-state drive (SSD), a hard disk drive (HDD), and so on. Collectively, memory unit 114 may store one or more software applications, the data received/used by those applications, and the data output/generated by those applications.

Memory unit 114 stores the software instructions of a CPE detection application 118 that, when executed by processing unit 110, determines a CPE status for the contents of a well based on a well image. While various modules of application 118 are discussed below, it is understood that those modules may be distributed among different software applications, and/or that the functionality of any one such module may be divided among different software applications.

In some embodiments, a visual inspection system (VIS) control module 120 of application 118 controls/automates operation of visual inspection system 102, via commands or other messages, such that images of the samples within the wells of well plate 204 in FIG. 2 can be generated with little or no human interaction. Visual inspection system 102 may send the images to computer system 104 for storage in memory unit 114, or another suitable memory not shown in FIG. 1. The operation of VIS control module 120 is discussed in further detail below. As noted above, however, visual inspection system 102 may not be externally controlled in certain embodiments, in which case VIS control module 120 may have less functionality than is described herein (e.g., only handling the retrieval of images from visual inspection system 102), or may be omitted entirely from application 118.

An image pre-processing module 122 of application 118 performs one or more operations to prepare a given well image for further processing. In particular, image pre-processing module 122 partitions a well image into a number of sub-images, and may perform one or more other tasks (e.g., removing portions of the well image that do not depict any contents of the well, and/or processing the well image to enhance contrast and/or remove noise, etc.). The sub-images may be square images, rectangular images, or have some other suitable shape (e.g., a pie slice shape that extends from the center of the well to the outer perimeter of the well). All sub-images may be of equal size, or the sizes may differ (e.g., with larger square images near the well center, and smaller square images near the outer perimeter of the well). The operation of image pre-processing module 122 is discussed in further detail below.

A sub-image scoring module 124 of application 118 analyzes each of some or all of the sub-images generated by image pre-processing module 122 using a CNN (e.g., one of ML model(s) 109). For each sub-image, the CNN outputs a score that indicates a likelihood that the well contents depicted in that sub-image exhibit CPE. Thus, each score may be viewed as a confidence level associated with a positive CPE classification for a respective sub-image. The CNN may include any suitable number of convolutional layers for two-dimensional convolution (e.g., to detect features such as edges within images), any suitable number of pooling layers (e.g., a down-sampling layer, to reduce computation while preserving the relative locations of features), and any suitable number of fully-connected layers (e.g., to provide high-level reasoning based on features). Alternatively (e.g., if visual inspection system 102 implements three-dimensional imaging techniques), the CNN of sub-image scoring module 124 may utilize three-dimensional convolution to detect features in three dimensions. The operation of sub-image scoring module 124 is discussed in further detail below.

A CPE classification module 126 of application 118 analyzes the sub-image scores for a particular well image, and outputs a CPE status for the well image. The CPE status may be binary (e.g., "CPE" versus "not CPE"), in which case CPE classification module 126 may generate the status by inputting the sub-image scores to an SVM (e.g., one of ML model(s) 109). If scores were determined for n+1 different sub-images of a well, for example, the SVM may classify the CPE status for the well contents using an n-dimensional hyperplane (e.g., a hyperplane constructed during training by training server 106). In other embodiments, the CPE status is some other suitable indicator relating to the existence of CPE, the likelihood of CPE, and/or the extent to which CPE exists, in the entirety of the well contents. For example, the CPE status may be a score that indicates a likelihood that the well contents exhibit CPE. As such, the CPE status may be expressed as a probability such as a percentage. Optionally, a determination may be made (for example, whether the risk of CPE is sufficiently low to use the well contents for further cell culture) based on whether the likelihood that the well contents exhibit CPE falls below a specified threshold, for example, less than or equal to 50%, 40%, 30%, 20%, 10%, 5%, 3%, 2%, 1%, or 0.1% probability that the well contents exhibited CPE. As another example, the CPE status may be the percentage portion of the well contents (e.g., by area) that exhibits CPE. In some embodiments, CPE classification module 126 also provides other information, such as information relating to the exhibited morphology (e.g., elongation, cell lysis, etc.). The operation of CPE classification module 126 is discussed in further detail below.

Operation of system 100, according to some embodiments, will now be described with reference to FIGS. 1 and 2, and with reference to a particular embodiment in which computer system 104 controls visual inspection system 102 and implements models trained by training server 106. Initially, in this embodiment, training server 106 trains ML model(s) 109 using data stored in a training database 130 (e.g., input/feature data, and corresponding labels). ML model(s) 109 includes a CNN implemented by sub-image scoring module 124, and possibly an SVM implemented by CPE classification module 126. Training database 130 may include a single database stored in a single memory (e.g., HDD, SSD, etc.), a single database distributed across multiple memories, or multiple databases stored in one or more memories. To train the CNN implemented by sub-image scoring module 124, training database 130 may include a large number of training data sets each corresponding to a single sub-image (e.g., with the same magnification level, size and/or other characteristics as the sub-images output by image pre-processing module 122), along with a label indicating a correct classification for that sub-image (e.g., "CPE" or "not CPE"). The labels may be classifications that were made by human analysts when reviewing the training sub-images. In some embodiments, the training data includes images of a variety of cell lines, to ensure that the CNN can accurately score sample sub-images across different cell lines.

Alternatively, to improve classification accuracy, ML model(s) 109 may include a different CNN for each of multiple cell lines (e.g., L929, PG4, Vero, and 324K cell lines), with each CNN having been trained using only sub-images that depict cells of the corresponding cell line. In such embodiments, computer system 104 may initially obtain copies of the CNNs for all cell lines, and sub-image scoring module 124 may select and implement the CNN corresponding to the cell line that is currently being inspected (e.g., as indicated by a user entering the cell line via a user interface of computer system 104, not shown in FIG. 1). Alternatively, computer system 104 may only retrieve the CNN for the cell line currently being inspected on an as-needed basis (e.g., by sending a request, including an indication of the user-specified cell line, to training server 106). If ML model(s) 109 include an SVM implemented by CPE classification module 126, the SVM may or may not be specific to the cell line currently being inspected, depending on the embodiment.

In some embodiments where ML model(s) 109 include a CNN (or one CNN per cell line, etc.) and an SVM (or one SVM per cell line, etc.), the SVM(s) is/are trained using outputs of the CNN(s). If ML model(s) 109 include a separate SVM for each cell line, each SVM may be trained using outputs of the trained CNN corresponding to that same cell line. As one example, for a given cell line, a CNN may be trained using thousands of well sub-images that were manually labeled by human analysts. Outputs (scores) generated by the CNN may then be used as inputs for training the SVM, with the labels for training the SVM (e.g., "CPE" or "not CPE" for entire well images) also being provided by a human analyst, or being determined automatically based on the manual labels that were assigned to the sub-images.

In some embodiments, training server 106 uses additional labeled data sets in training database 130 in order to validate the generated ML model(s) 109 (e.g., to confirm that a given one of ML model(s) 109 provides at least some minimum acceptable accuracy). Training server 106 then provides ML model(s) 109 to computer system 104 (e.g., via a remote download over network 108) or, in a cloud computing embodiment, either implements ML model(s) 109 locally or provides ML model(s) 109 to one or more other servers. In some embodiments, training server 106 also updates/refines one or more of ML model(s) 109 on an ongoing basis. For example, after ML model(s) 109 are initially trained to provide a sufficient level of accuracy, visual inspection system 102 or computer system 104 may provide additional images to training server 106 over time, and training server 106 may use supervised or unsupervised learning techniques to further improve the model accuracy.

Each of the wells within well plate 204 of visual inspection system 102 is at least partially filled, either automatically or manually, with a medium that includes suitable nutrients for cells (e.g., amino acids, vitamins, etc.), growth factors, and/or other ingredients, and the well is inoculated with cells of a particular cell line. As used herein, a "particular cell line" refers to a cell line having a discrete identity, such as a specified cell line. Well plate 204 is then loaded onto stage 202, and VIS control module 120 causes visual inspection system 102 to move stage 202, illumination system 208, and/or other components (e.g., one or more mirrors) in small increments, and to activate imager 210 (and possibly illumination system 208) in a synchronized manner, such that imager 210 captures at least one image for each of the wells in well plate 204.

Either as well images are generated, or in batches after subsets (or all) of the images have been generated (e.g., after locally storing all images on a hard drive), visual inspection system 102 sends the images to computer system 104 for automated analysis. As with the process of capturing well images, the process of transferring images to computer system 104 may be automated (e.g., triggered by commands from VIS control module 120), in some embodiments.

The process of imaging the wells in well plate 204 may be repeated in certain embodiments and/or scenarios. For a $TCID_{50}$ assay, for instance, VIS control module 120 may cause visual inspection system 102 to capture an image of each well at each of a series of different dilution levels. In some embodiments, VIS control module 120 (or another module within application 118) also controls/automates a system (not shown in FIG. 1) that sets the dilution levels for the well samples.

For each of the well images received from visual inspection system 102, as noted above, image pre-processing module 122 partitions the well image into sub-images, and possibly performs one or more other pre-processing operations such as removing parts of the image that depict areas outside of the well. Sub-image scoring module 124 then uses a CNN of ML model(s) 109 to score each sub-image, with the score indicating the likelihood that the well contents depicted in the sub-image exhibit CPE. The score may be a confidence level associated with a classification of "CPE," for example. CPE classification module 126 then analyzes all of the scores for the sub-images of that well to determine the CPE status of the well. For example, CPE classification module 126 may use an SVM of ML model(s) 109 to classify the well contents as "CPE" or "not CPE." As another example, CPE classification module 126 may apply one or more heuristics to classify the well contents (e.g., by classifying the contents of the well as "CPE" any time that the scores for the sub-images, when added, exceed some threshold value, or any time at least three sub-images have a score over 0.5000, etc.). Regardless of how CPE classification module 126 uses the scores to classify the well contents, the process may be repeated for different well images until a suitable stopping point is reached (e.g., until images of all wells in a well plate are analyzed, or until images of all wells at all desired dilution levels are analyzed, etc.).

Application 118 also generates output data reflecting the classification/status as determined by CPE classification module 126. This output data may take various forms, and be used in various ways, depending on the embodiment. For example, application 118 may cause a user interface (e.g., a GUI displayed on a screen of computer system 104 or another system, not shown in FIG. 1) to present the output data, including the CPE status of one or more well images, to a user. As another example, application 118 may send the output data to another application being executed on computer system 104 (or another system not shown in FIG. 1), e.g., to trigger a next stage in a viral clearance or other process. As another example, application 118 may, based on the generated output data, cause samples within wells exhibiting CPE to be discarded or set aside for other purposes.

Figure 3:
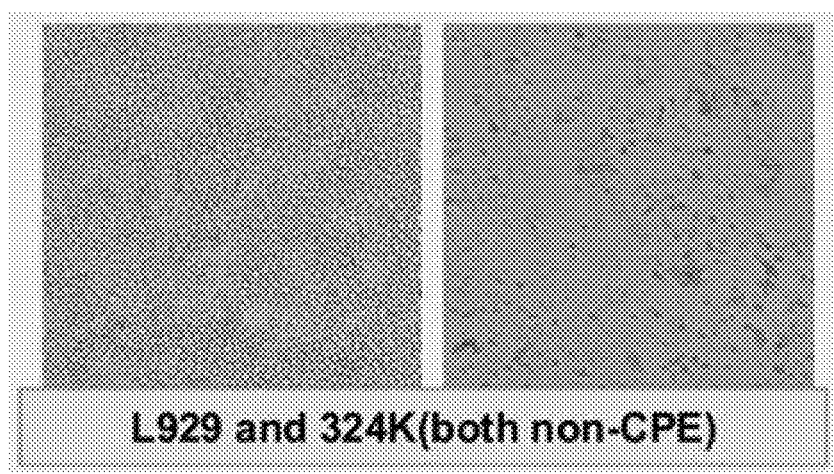
FIG. 3 depicts example images of various well samples of different cell lines, with and without CPE.
Figure 3:
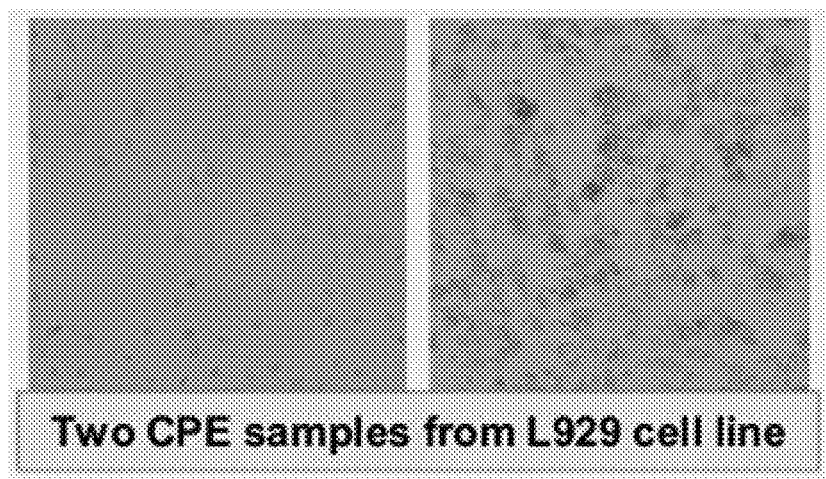
Figure 3:
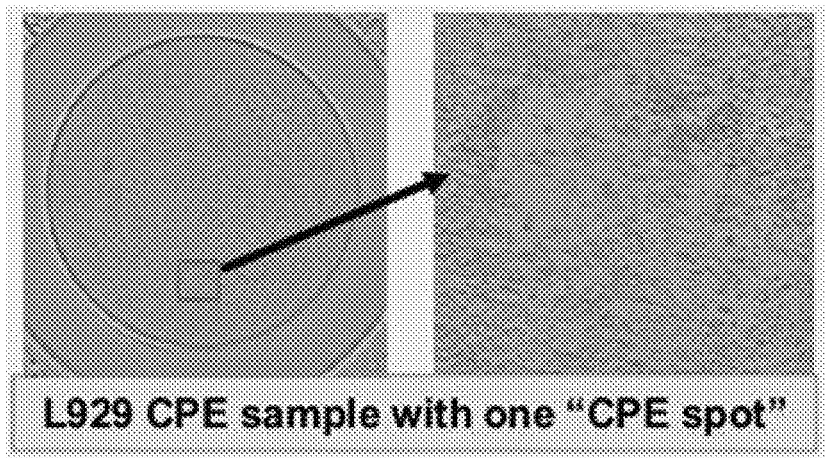

FIG. 3 depicts example images of various well samples of different cell lines, with and without CPE, to illustrate some of the challenges that may be associated with determining CPE status of a sample based on a well image if using conventional approaches. A first image pair 300 shows L929 (left) and 324K (right) cell lines that do not exhibit CPE, while a second image pair 302 shows two different morphologies of the L929 cell line when exhibiting CPE. Each of the images in image pair 300 and each of the images in image pair 302 may be a sub-image from a larger well image, for example.

As can be seen from the image pairs 300 and 302, L929 cells exhibiting CPE may be quite difficult to distinguish from 324K cells not exhibiting CPE. Accordingly, as noted above, sub-image scoring module 124 may implement a CNN that is specific to the cell line being inspected. Image pair 302 further shows that even a single cell line can have very different morphologies (e.g., when infected by different viruses). Thus, even for a single cell line, it may be beneficial for training server 106 to train the CNN corresponding to that cell line using samples with different morphologies. Well sub-images corresponding to different morphologies may be intentionally introduced into training database 130, or may simply be a result of having a suitably large database (e.g., thousands, or tens of thousands, etc., of well sub-images).

A third image pair 304 shows, on the left, an image of an entire well containing cells of the L929 cell line, and on the right, a specific sub-image corresponding to one portion of that well image. This example illustrates the fact that, conventionally, CPE may also be difficult to detect due to its localization within the well. In the image pair 304, for instance, CPE is exhibited as a relatively small spot within the well. The potential localization of CPE, and/or other patterns or trends of CPE that may occur with different cell lines and/or different viruses, may inherently be accounted for by CPE classification module 126 when analyzing the sub-image scores for a given well image. To ensure that CPE classification module 126 can handle such variations, an SVM of CPE classification module 126 may have been trained using sub-image score arrangements that reflect different types of CPE patterns and/or localization.

Figure 4:
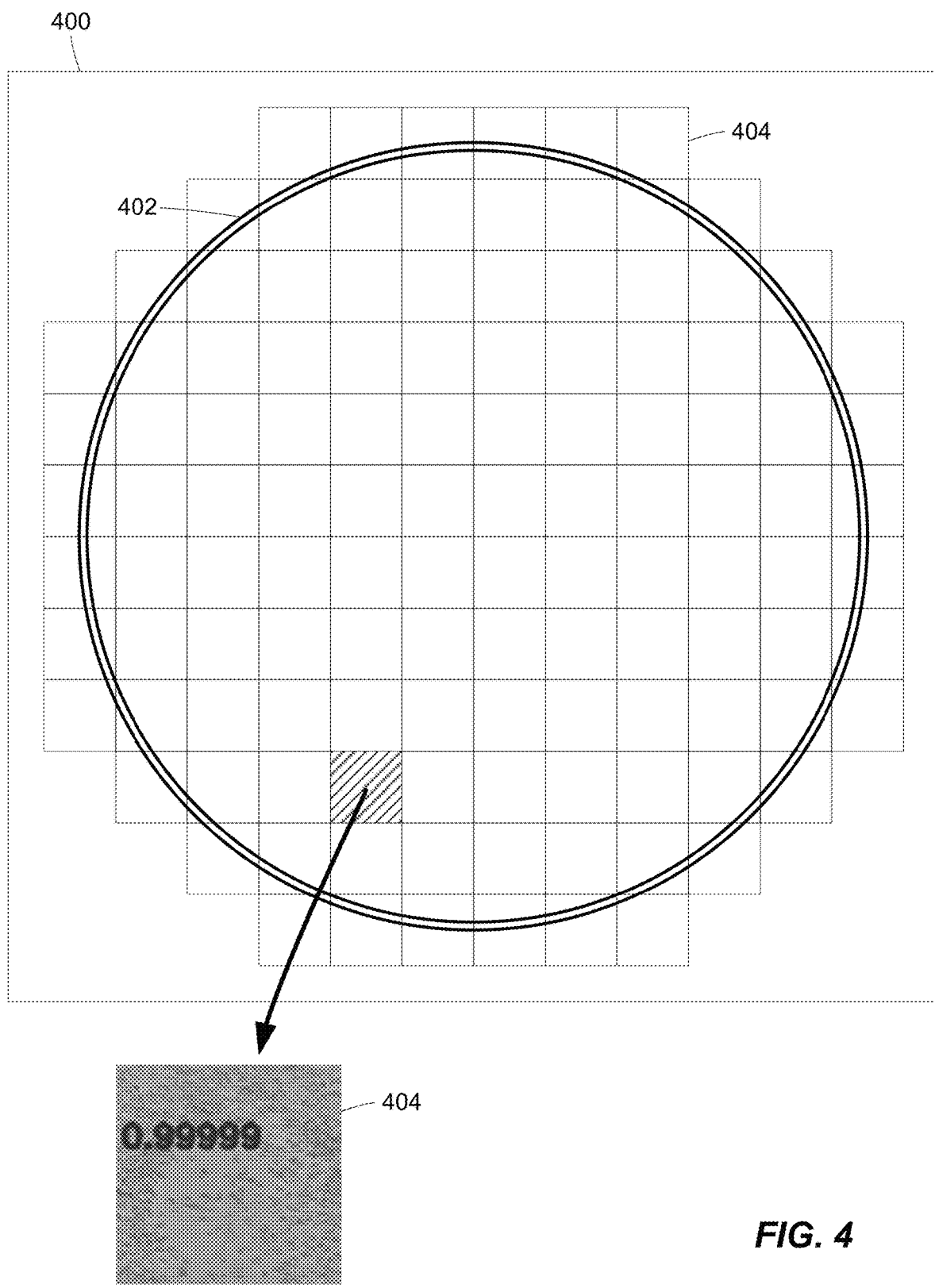
FIG. 4 depicts an example of a partitioned well image.

FIG. 4 depicts an example image 400 of a well 402. Well 402 may be one of the wells in well plate 204, and/or well image 400 may be an image that was generated by visual inspection system 102 in response to a command from VIS control module 120, for example. Well image 400 may represent a bottom-up perspective of well 402.

Image pre-processing module 122 partitions well image 400 into a number of sub-images 404. While FIG. 4 shows that sub-images 404 are generated only in areas of image 400 that depict at least a portion of well 402, in other embodiments the entire well image 400 may be partitioned into equal-size sub-images, and/or sub-images of different sizes and/or shapes may be generated. Regardless of whether the entire well image 400 is partitioned, image pre-processing module 122 may discard or ignore the portions of well image 400 that do not depict at least a portion of well 402. This cropping of well image 400 may occur before or after the partitioning into sub-images 404. To ensure that sub-image scoring module 124 can accurately assess sub-images that include part of the wall of well 402, and/or areas outside of well 402, the training data for the CNN of sub-image scoring module 124 may have included similar sub-images. Alternatively, image pre-processing module 122 may entirely remove the wall of well 402, and the areas outside well 402, prior to the analysis performed by the CNN of sub-image scoring module 124.

FIG. 4 also depicts an expanded view of one of sub-images 404. In the depicted embodiment and scenario, the CNN of sub-image scoring module 124 has generated a score of 0.99999 for the expanded-view sub-image 404, as a result of a CPE spot in the corresponding portion of well 402. While not shown in FIG. 4, it is understood that scores for all of the other sub-images 404 may also be determined by sub-image scoring module 124. In other embodiments, however, not all of sub-images 404 are scored. In an example embodiment where CPE classification module 126 classifies the contents of any given well as "CPE" so long as at least one of the sub-images in the well is scored over some threshold (e.g., over 0.90000), for example, then sub-image scoring module 124 may save processing time/power by ceasing to analyze additional sub-images as soon as a first sub-image score for that well exceeds the threshold. By way of example, the threshold may be greater than or equal to 0.70, 0.80, 0.85, 0.90, 0.95, 0.97, 0.98, 0.99, or 0.999 (which may also be expressed as corresponding percentage probabilities, such as 70%, 85%, 90%, 95%, 97%, 98%, 99%, or 99.9%). Any system or method or computer readable medium as described herein may cease to analyze additional sub-images as soon as a first sub-image score for that well exceeds the threshold.

As noted herein, in some embodiments where CPE classification module 126 uses an SVM, and the SVM is trained specifically for the cell line being inspected. In this manner, the classification process performed by the SVM may inherently take into account patterns that are typical for that cell line. As a relatively simple example, if a first cell line typically exhibits only smaller, localized CPE spots, while a second cell line can (with roughly equal probability) exhibit CPE as either small spots or larger, contiguous areas, an SVM for the first cell line may be more likely to classify the contents of well 402 as "CPE" if the sub-images 404 having high scores collectively form a spot-like pattern, whereas an SVM for the second cell line may not give much (if any) weight to the relative positioning of the sub-images 404 having high scores.

Figure 5:
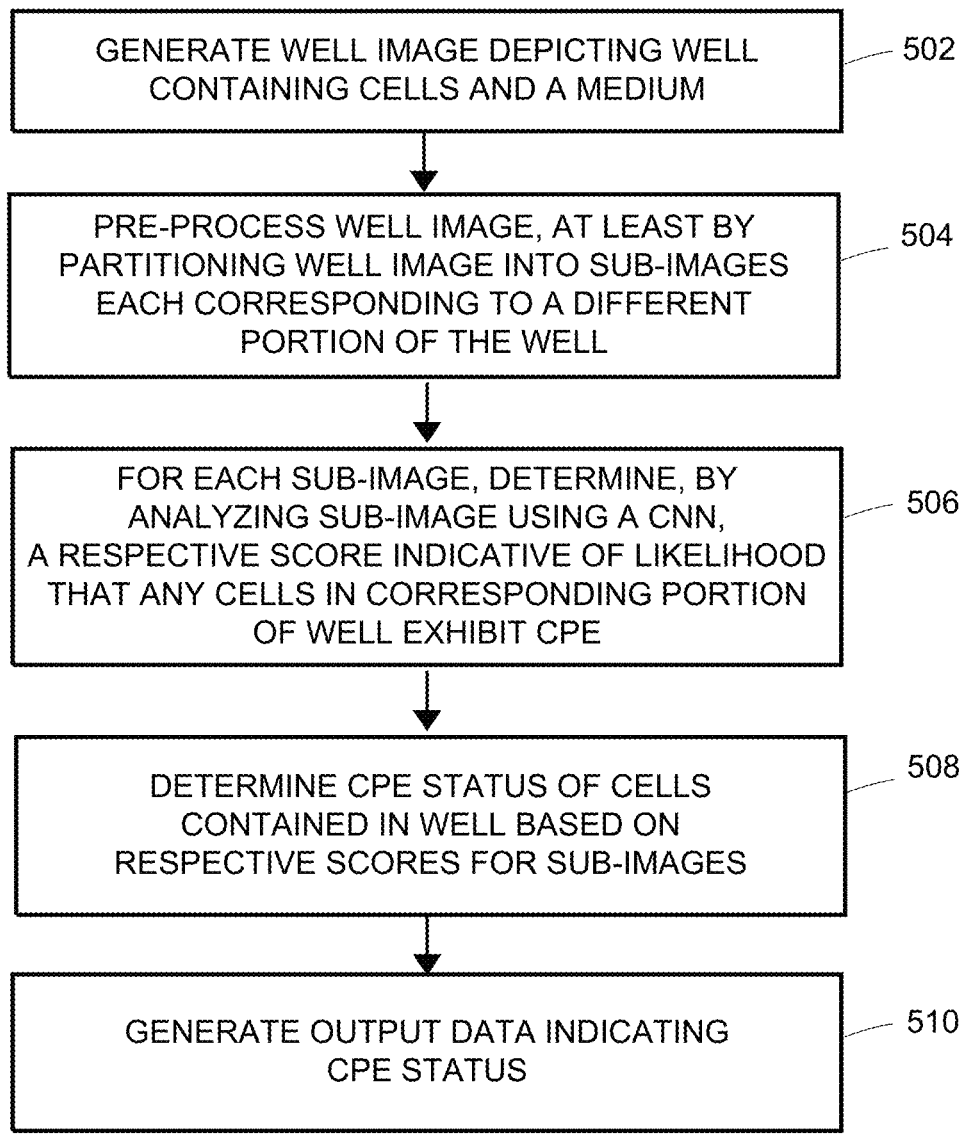
FIG. 5 is a flow diagram of an example method for detecting cytopathic effect (CPE) in a well sample.

FIG. 5 is a flow diagram of an example method 500 for detecting CPE in a well sample. Method 500 may be implemented by one or more portions of system 100 (e.g., visual inspection system 102 and computer system 104) or another suitable system. As a more specific example, block 502 of method 500 may be implemented by at least a portion of visual inspection system 102 of FIGS. 1 and 2, while blocks 504 through 510 may be implemented by computer system 104 (e.g., by processing unit 110 when executing instructions stored in memory unit 114).

At block 502 of method 500, an image of a well containing cells and a medium (and possibly viruses, e.g., according to a controlled dilution) is generated by an imaging unit (e.g., by imager 210 in FIG. 2). The medium may contain cell nutrients, growth factors, etc., and was previously inoculated with cells (e.g., cells of a single cell line).

At block 504, the well image is pre-processed, at least by partitioning the well image into multiple sub-images that each correspond to a different portion of the imaged well. In some embodiments, the pre-processing also includes one or more other operations, such as removing one or more portions of the well image that correspond to one or more areas outside of the well, for example.

At block 506, for each of the sub-images, a respective score is determined using a CNN. Block 506 may occur entirely after block 504, or partially in parallel with block 504 (e.g., as sub-images are generated). The score for each sub-image is indicative of the likelihood that any cells in the corresponding portion of the well exhibit CPE. The score may be a confidence level associated with a "CPE" classification, for example. The score may be output by the CNN, or a result of some further processing of the CNN output and/or other factors. The CNN may be specific to a particular cell line corresponding to the cells in the well (e.g., the CNN may have been trained using labeled images of wells containing cells of that cell line). In one such embodiment, method 500 includes an additional block, occurring sometime prior to block 506, in which the appropriate CNN is selected from among multiple CNNs associated with different cell lines (e.g., based on an input indicating the cell line that corresponds to the cells in the well, such as a user input, or an identifier such as a barcode associated with the well).

At block 508, a CPE status of the cells contained in the well is determined based on the scores determined at block 506. The CPE status may be a binary indicator of whether the cells exhibit CPE. For example block 508 may include inputting the respective scores to an SVM, which outputs the CPE status (e.g., "CPE" or "no CPE") or a value on which the CPE status is based (e.g., based on one or more additional factors). In other embodiments, the CPE status is not binary. For example, the CPE status may be a probability of the existence of CPE, and/or an extent to which CPE is (or is likely) exhibited.

At block 510, output data indicating the CPE status determined at block 508 is generated. The output data may be displayed to a user on a user interface of a computing device (e.g., by sending the output data, and a command that causes display of the output data, to another device or module), for example, and/or may be sent to one or more other software modules and/or computer systems for various purposes (e.g., to indicate viral clearance for a particular batch and/or trigger a next phase of cell line development, etc.).

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for detecting cytopathic effect (CPE) in a well sample, the method comprising:
   generating, by an imaging unit, a well image depicting a well containing cells and a medium;
   pre-processing, by one or more processors, the well image, wherein pre-processing the well image includes partitioning the well image into a plurality of sub-images each corresponding to a different portion of the well;
   for each of some or all of the plurality of sub-images, determining, by the one or more processors analyzing the sub-image using a convolutional neural network, a respective score indicative of a likelihood that any cells in the portion of the well corresponding to the sub-image exhibit CPE;
   determining, by the one or more processors and based on the respective scores for the plurality of sub-images, a CPE status of the cells contained in the well;
   generating, by the one or more processors, output data indicating the CPE status; and
   wherein, if the respective score indicative of the likelihood that any cells in the portion of the well corresponding to the sub-image exhibit CPE exceeds a specified threshold, the one or more processors cease the analysis, and the CPE status is determined based on the respective score exceeding the specified threshold.

2. The method of claim 1, wherein determining the CPE status of the cells contained in the well includes making a binary determination of whether the cells contained in the well exhibit CPE.

3. The method of claim 2, wherein making the binary determination of whether the cells contained in the well exhibit CPE includes inputting the respective scores to a support vector machine (SVM).

4. The method of claim 1, wherein:
   the cells contained in the well are cells of a particular cell line; and
   the convolutional neural network is trained using labeled images of wells containing cells of the particular cell line.

5. The method of claim 4, further comprising, prior to determining the respective scores:
   selecting, by the one or more processors and based on a user input indicating the particular cell line, the convolutional neural network from among a plurality of convolutional neural networks each associated with a different cell line.

6. The method of claim 1, wherein pre-processing the well image further includes removing one or more portions of the well image corresponding to one or more areas outside of the well.

7. The method of claim 1, further comprising:
   causing, by the one or more processors, a user interface to display the output data indicating the CPE status to a user.

8. The method of claim 1, wherein the CPE status of the cells contained in the well is determined to comprise at least one of:
   (a) a "not CPE" status; or
   (b) a probability below a specified threshold that the contents of the well image, as a whole, exhibit CPE,
   the method further comprising transferring a cell of the well to a new culture environment, and culturing the cell in the new culture environment.

9. One or more non-transitory computer-readable media storing instructions that, when executed by one or more processors, cause the one or more processors to:
   pre-process a well image depicting a well containing cells and a medium, at least in part by partitioning the well image into a plurality of sub-images each corresponding to a different portion of the well;
   for each of some or all of the plurality of sub-images, determine, by analyzing the sub-image using a convolutional neural network, a respective score indicative of a likelihood that any cells in the portion of the well corresponding to the sub-image exhibit CPE;
determine a CPE status of the cells contained in the well based on the respective scores for the plurality of sub-images;
generate output data indicating the CPE status; and
wherein, if the respective score indicative of the likelihood that any cells in the portion of the well corresponding to the sub-image exhibit CPE exceeds a specified threshold, the instructions cause the one or more processors to cease the analysis, and to determine the CPE status based on the respective score exceeding the specified threshold.

10. The one or more non-transitory computer-readable media of claim 9, wherein the instructions cause the one or more processors to determine the CPE status of the cells contained in the well at least by making a binary determination of whether the cells contained in the well exhibit CPE.

11. The one or more non-transitory computer-readable media of claim 10, wherein making the binary determination of whether the cells contained in the well exhibit CPE includes inputting the respective scores to a support vector machine (SVM).

12. The one or more non-transitory computer-readable media of claim 9, wherein:
the cells contained in the well are cells of a particular cell line; and
the convolutional neural network is trained using labeled images of wells containing cells of the particular cell line.

13. The one or more non-transitory computer-readable media of claim 12, wherein the instructions further cause the one or more processors to, prior to determining the respective scores:
select, based on a user input indicating the particular cell line, the convolutional neural network from among a plurality of convolutional neural networks each associated with a different cell line.

14. The one or more non-transitory computer-readable media of claim 9, wherein the instructions cause the one or more processors to pre-process the well image further by removing one or more portions of the well image corresponding to one or more areas outside of the well.

15. The one or more non-transitory computer-readable media of claim 9, wherein the instructions further cause the one or more processors to:
cause a user interface to display the output data indicating the CPE status to a user.

16. A system comprising:
a visual inspection system including
a stage configured to accept a well plate, and
an imaging unit configured to generate images of wells within the well plate, wherein each image corresponds to a single well; and
a computer system including
one or more processors, and
one or more memories storing instructions that, when executed by the one or more processors, cause the computer system to
pre-process a well image, generated by the imaging unit and depicting a well containing cells and a medium, at least in part by partitioning the well image into a plurality of sub-images each corresponding to a different portion of the well,
for each of some or all of the plurality of sub-images, determine, by analyzing the sub-image using a convolutional neural network, a respective score indicative of a likelihood that any cells in the portion of the well corresponding to the sub-image exhibit CPE,
determine a CPE status of the cells contained in the well based on the respective scores for the plurality of sub-images,
generate output data indicating the CPE status; and
wherein, if the respective score indicative of the likelihood that any cells in the portion of the well corresponding to the sub-image exhibit CPE exceeds a specified threshold, the instructions cause the computer system to cease the analysis, and to determine the CPE status based on the respective score exceeding the specified threshold.

17. The system of claim 16, wherein the instructions cause the computer system to determine the CPE status of the cells contained in the well at least by making a binary determination of whether the cells contained in the well exhibit CPE.

18. The system of claim 17, wherein the instructions cause the computer system to make the binary determination of whether the cells contained in the well exhibit CPE at least by inputting the respective scores to a support vector machine (SVM).

19. The system of claim 15, wherein:
the cells contained in the well are cells of a particular cell line; and
the convolutional neural network is trained using labeled images of wells containing cells of the particular cell line.

20. The system of claim 19, wherein the instructions further cause the computer system to, prior to determining the respective scores:
select, based on an input indicating the particular cell line, the convolutional neural network from among a plurality of convolutional neural networks each associated with a different cell line.

21. The system of claim 16, wherein the computer system further comprises a display unit, and wherein the instructions further cause the computer system to:
cause the display unit to display the output data indicating the CPE status to a user.

* * * * *